(12) United States Patent   (10) Patent No.: US 9,194,474 B2
Liu   (45) Date of Patent: Nov. 24, 2015

(54) RING DISK RECIPROCATING POWER CONVERSION DEVICE

(76) Inventor: Wen-Ching Liu, Taipei (TW)

( * ) Notice: Subject to any disclaimer, the term of this patent is extended or adjusted under 35 U.S.C. 154(b) by 589 days.

(21) Appl. No.: 13/419,432

(22) Filed: Mar. 14, 2012

(65) Prior Publication Data

US 2012/0279331 A1   Nov. 8, 2012

(30) Foreign Application Priority Data

May 6, 2011   (TW) .............................. 100104054 A

(51) Int. Cl.
*F16H 37/12* (2006.01)
*F16H 3/72* (2006.01)
*F16H 21/36* (2006.01)

(52) U.S. Cl.
CPC .............. *F16H 37/124* (2013.01); *F16H 3/722* (2013.01); *F16H 21/36* (2013.01); *Y10T 74/18272* (2015.01)

(58) Field of Classification Search
CPC .......... F16H 37/12; F16H 3/722; F16H 47/04
USPC .................. 475/91, 92, 93, 98, 104, 112, 323
See application file for complete search history.

(56) References Cited

U.S. PATENT DOCUMENTS

| | | | | |
|---|---|---|---|---|
| 2,126,662 A | * | 8/1938 | Ramsey | .......................... 475/97 |
| 5,159,846 A | * | 11/1992 | Warner | ............................. 74/69 |
| 6,220,116 B1 | * | 4/2001 | Warner | ........................ 74/813 C |

* cited by examiner

*Primary Examiner* — Edwin A Young
*Assistant Examiner* — Colby M Hansen
(74) *Attorney, Agent, or Firm* — Chun-Ming Shih

(57) ABSTRACT

A ring disk reciprocating power conversion device includes a planetary gear set and at least one eccentric control panel set. The eccentric control panel set includes a rotary disk pivoted on the opposite end of the planetary gear set, which can be guided by the rotation of the plurality of planet wheels of the planetary gear set, forcing the rotary disk to do a reciprocating movement in limited amplitude. The periphery of the rotary disk forms annular chambers. The annular chambers accommodate a pressure forming medium. More than one variable volume chambers are formed in the annular chambers, and the periphery of the rotary disk is provided with a plurality of spacers which has equal quantities as that of the variable volume chambers. The spacers can press or draw the medium and further regulate and stop the rotation of the planet wheel.

7 Claims, 12 Drawing Sheets

(A-A)

(B-B)

(D-D)

RING DISK RECIPROCATING POWER CONVERSION DEVICE

RELATED APPLICATIONS

This application claims priority to Taiwan Application Serial Number 100104054, filed May 6, 2011, which is herein incorporated by reference.

BACKGROUND OF THE INVENTION

1. Field of the Invention

Present invention provides a ring disk reciprocating power conversion device, especially a planetary gear set and an eccentric control panel set used to convert power, and more especially a rotary disk of the eccentric control panel set used to guide the planet wheel, and a variable volume chamber and spacer used to control the rotation of the planet wheel. Present invention also relates to an oil resilient torque convertor, a rotation damping decelerator, a compressor, and a switch chamber type internal combustion engine, which are all built by the ring disk reciprocating power conversion device.

2. Description of the Related Art

The traditional power conversion technique is mainly used in the torque conversion on the transportation vehicle. The technique includes a soft oil pressure flowing type torque converting device, which has two corresponding propeller blades, and one of the propeller blades drives the oil to generate oil eddy to propel another propeller blade in order to reach the purpose of power conversion. However, the propelling force of one of the propelling blades cannot be fully reflected on the power output of another propelling blade, which results the problem of power lost in the power conversion.

Besides, the traditional rotation deceleration technique mainly uses a brake lining to clamp or make a friction against the axle or the wheel frame to decelerate. However, after long time of being clamped and frictioned, the brake lining is easy to overheat to cause brake failure.

Moreover, the traditional compressor includes piston type and scroll type. The compressing and drawing efficiency of scroll type compressor is better than the other one, but the power of compressing and drawing is not strong enough, which is also hard to be improved. Thus, the scroll type compressor cannot be used when the strong compressing power is needed. The piston type compressor has relatively good compressing power, but only one time of compressing can be made in one compression cycle, which results in bad efficiency of compressing.

In addition, traditional combustion engine has a fixed type cylinder, and by the explosion power of the fuel, the piston in the cylinder can be driven to push the crank to output the power. However, half of the explosion power pushes against the surface of the piston, and the other half of the explosion power pushes against the cylinder head. After 10% power losing, the explosion power which pushes against the cylinder head will be reflected back from the cylinder head to push the piston surface again, which causes time differences for the twice pushing on the piston surface. Thus, the explosion power cannot be fully transformed to the piston propelling power.

Presently, combining the foresaid techniques of rotation deceleration, compressor, and combustion engine has not been disclosed in the traditional power conversion technique, which means lots of improvement can be made in the future.

SUMMARY OF THE INVENTION

Present invention aims to overcome the problems of the prior arts as follows:

1. Using two propelling blades via oil to output power, which causes high power lost.
2. Using brake lining to clamp or make a friction against the rotation elements can result in brake failure due to overheat caused by the continuous friction of the brake lining.
3. The compressing power and efficiency of the traditional piston type and scroll type compressor cannot be improved.
4. The explosion power of the fuel is partially lost in the cylinder, and the explosion time differences of the two times pushing on the piston surface causes the power of the explosion unable to be fully transformed to the piston propelling power.

In order to solve the problems mentioned above, present invention provides a ring disk reciprocating power conversion device, comprising:

a planetary gear set provided with a solar wheel and a plurality of planet wheels engaged in the periphery of the solar wheel;

at least one off-center control panel set, comprising:
- a rotary disk pivoted on a center axle of the solar wheel and arranged opposite to the planetary gear set, being able to receive the guiding from rotation of the planet wheel, forcing the rotary disk to do a reciprocating movement in limited amplitude;
- an annular chamber, formed in the periphery of the rotary disk, the annular chamber accommodating a pressure forming medium, wherein the medium is oil;
- a plurality of separation parts, separating the annular chamber to form plurality of variable volume chambers; and
- a plurality of spacers equal to the variable volume chambers, movably arranged in the periphery of the rotary disk, and being able to enter the variable volume chambers to press or draw the medium to regulate and stop rotation of the planet wheel, and being able to exit the variable volume chambers to release the planet wheel for rotation.

When the outer power is applied to the solar wheel, the rotation of the planet wheel can be driven via the solar wheel, and the outer power can be engine power. The rotation of the planet wheel guides the rotary disk to do a reciprocating movement, making the planet wheel to do the revolution and without fully reflecting the power of the solar wheel. When the spacer enters the variable volume chamber to regulate and stop the rotation of the planet wheel, the solar wheel can drive the planet wheel to enhance the revolution force. By increasing the revolution force of the planet wheel, the output of the solar wheel can be increased as well. As such, by an oil flowing cut-off technique, such as dampening or locking the rotation of the planet wheel, the power output can be controlled, and the power conversion efficiency can be improved.

In fact, the center axle of the solar wheel is provided with a first axial rod, and an end surface of the planet wheel movably hitches a frame piece, and the center axle of the frame piece is provided with a second axial rod. The first axial rod is used as a power input terminal, and the first axial rod can drive the planet wheel to rotate via the solar wheel, and the second axial rod is used as a power output terminal to transfer the revolution power of the planet wheel.

In present invention, the outer power can be input to the planet wheel to directly drive the planet wheel. The outer power can be the power of the wheel axle. The rotary disk is guided by the rotation of the planet wheel to do the reciprocating movement, and the planet wheel does the revolution along the solar wheel. When the spacer enters the variable volume chamber to regulate and stop the rotation of the planet wheel, the revolution of the planet wheel along the solar wheel can be lowered or stopped, and the power of the outer wheel axle is reducing or stopping. By utilizing the damping effect of the oil cut-off, the deceleration of the outer wheel axle can be achieved, and the brake failure due to overheat will no longer exist.

In fact, the first axial rod can be used as the fixed end to brake the planet wheel, and the second axial rod can be used as the movable end to drive the planet wheel, or vice versa. The movable end can drive the planet wheel to rotate or do the revolution along the solar wheel.

In another embodiment of the present invention, a plurality of troughs with equal quantities as that of the plurality of spacers are formed in the periphery of the rotary disk. The troughs are able to accommodate the spacers, and the spacers can enter the variable volume chamber via the trough, or exit the variable volume chamber to enter the trough. The center axle of the rotary disk is provided with a casing tube. The casing tube connects the spacers, and the casing tube can drive the spacers to enter or exit the variable volume chamber.

Besides, present invention provides another ring disk reciprocating power conversion device, comprising:

a planetary gear set provided with a solar wheel and a plurality of planet wheels engaged in the periphery of the solar wheel;

at least one eccentric control panel set, comprising:
a rotary disk pivoted on a center axle of the solar wheel and arranged opposite to the planetary gear set, being able to receive the guiding from rotation of the planet wheel, forcing the rotary disk to do a reciprocating movement in limited amplitude;
an annular chamber, formed in the periphery of the rotary disk, and the annular chamber accommodating a pressure forming medium, wherein the medium is air or coolant;
a plurality of separation parts, separating the annular chamber to form a plurality of variable volume chambers; and
a plurality of spacers equal to the variable volume chambers, fixed to the periphery of the rotary disk, the spacers separating the variable volume chambers and being able to press or draw the medium.

The spacer and separation part are used to separate the variable volume chambers to form four compressing and drawing chambers. The outer power is applied to the solar wheel, and the planet wheel is driven by the solar wheel. The outer power can be motor power. The rotary disk is guided by the rotation of the planet wheel, making the spacer with the rotary disk to do the reciprocating movement in limited amplitude, and thus compressing or drawing the air or the coolant in the chamber. By the volume changing in every variable volume chambers, the compressing and drawing operation can be continuously alternated to compress or draw the air or coolant. Thus, the power and the efficiency of the compressing and drawing can be improved.

Practically, the center axle of the solar wheel is provided with a first axial rod which is used as the power input terminal. Or, the medium of present invention can be fuel oil, and the fuel oil can be ignited in one of the variable volume chambers to generate the explosion power. The explosion power drives the spacers to further drive the rotary disk to do the reciprocating movement in limited amplitude, which results in the rotation of the planet wheel. The rotation of the planet wheel drives the solar wheel to output the power. Meanwhile, the spacers press the fuel oil in another variable volume chamber. By those described above, the chamber can be used as drawing chamber, compressing chamber, explosion chamber, and emission chamber, and the planet wheel can be driven and continuously drives the solar wheel to output the power, improving the power output efficiency from converting the explosion power of the fuel oil. The center axle of the planet wheel is pivoted in a fixed position around the periphery of the solar wheel, or the center axle of the planet wheel uses the rotary disk as a fixed end to pivot the planet wheel around the periphery of the solar wheel. Or, the center axle of the planet wheel uses the gear rim as a fixed end to pivot the planet wheel around the solar wheel.

In one embodiment of the present invention, the eccentric control panel set is provided with a shell, an interior wall of the shell is provided with a first engagement part and a second engagement part corresponding to the first engagement part, the planetary gear set is pivoted on the first engagement part, the rotary disk is pivoted on the second engagement part, and the annular chamber is formed between the outer periphery of the rotary disk and the interior wall of the shell, and one side of the rotary disk is corresponding to the planetary gear set.

In another embodiment, present invention further comprises:

a plurality of first guiding grooves, using the solar wheel as a center and formed in the first engagement part in a radial shape, respectively;

two end surfaces of the planet wheel being provided with an eccentric axis respectively, the eccentric axis being arranged on both sides of the center axle of the planet wheel respectively; and a plurality of second guiding grooves, using the center axle of the rotary disk as a center and formed in the plate surface in a radial shape, the planet wheel via the eccentric axis being guided by the first guiding groove and the second guiding groove respectively to rotate, the rotary disk being guided by the eccentric axis to do the reciprocating movement via the second guiding groove.

The eccentric axis is pivoted with a sliding member, and the sliding member is slidably arranged in the guiding groove. The separation part is formed in the interior of the shell.

In still another embodiment, the ring disk reciprocating power conversion device has four planet wheels, which are arranged on the periphery of the solar wheel, respectively, the ring disk reciprocating power conversion device having two eccentric control panel sets, each of the eccentric control panel sets leading two planet wheels to rotate respectively, the ring disk reciprocating power conversion device having two separation parts, the two separation parts separating the annular chamber to form two variable volume chambers. The outer periphery of the planet wheel engages a self-rotatable gear rim, the two end surfaces of the gear rim are provided with a ring, respectively, the planet wheel is situated between the rings, the two end surfaces of the planet wheel movably hitches a frame piece, and the frame piece is situated in the ring.

In order to facilitate the movement for the separation part in the medium, the sectional view of the separation part is formed in H shape.

BRIEF DESCRIPTION OF THE DRAWINGS

The invention is illustrated by way of example, and not by way of limitation, in the figures of the accompanying drawings in which like reference numerals refer to similar elements and in which.

DETAILED DESCRIPTION OF THE INVENTION

Figure 1:
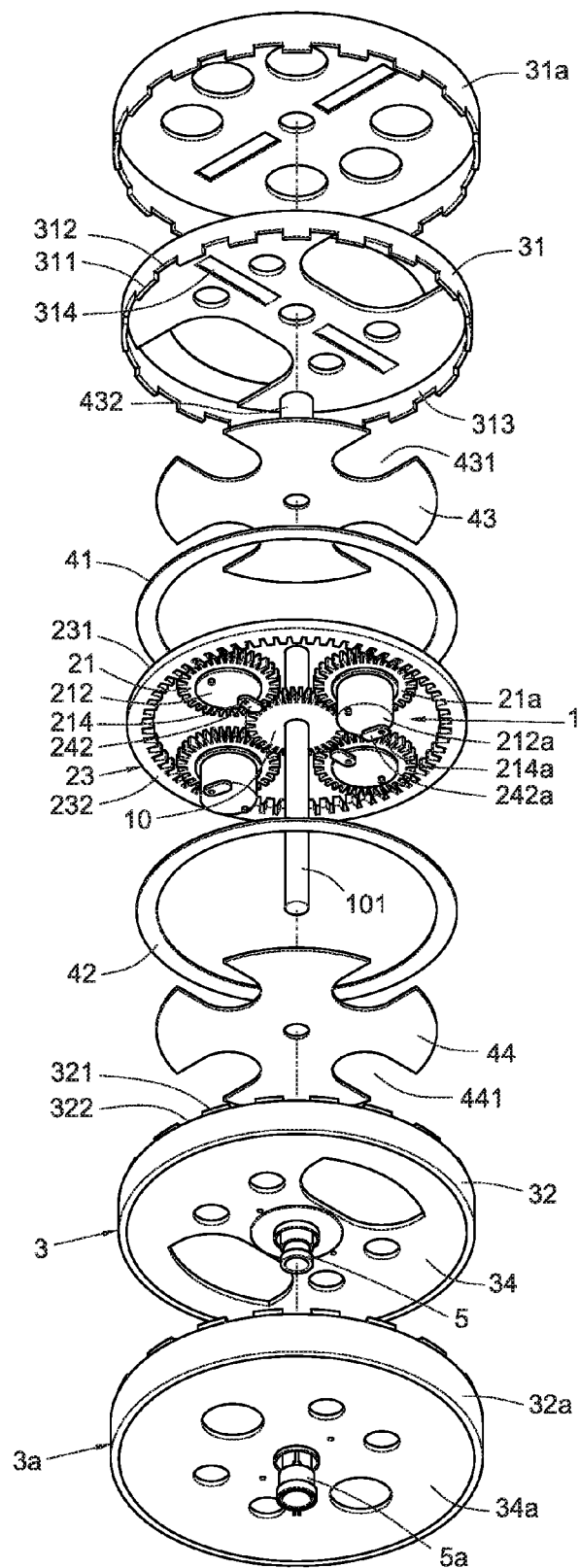
FIG. 1 is an exploded view of the first embodiment of present invention.
Figure 2:
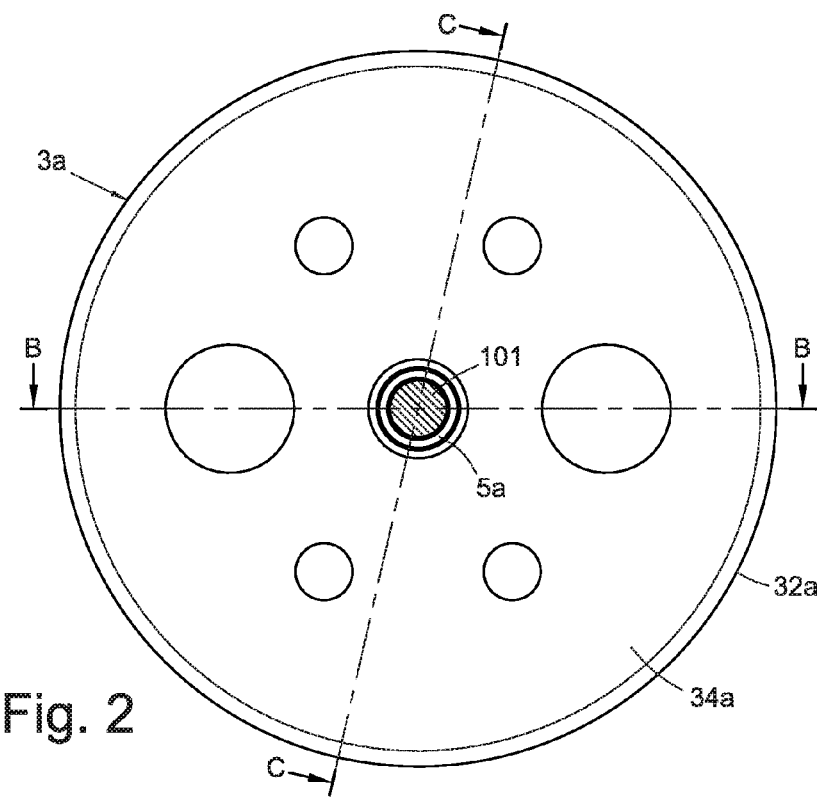
FIG. 2 is a front view of the present invention.
Figure 3:
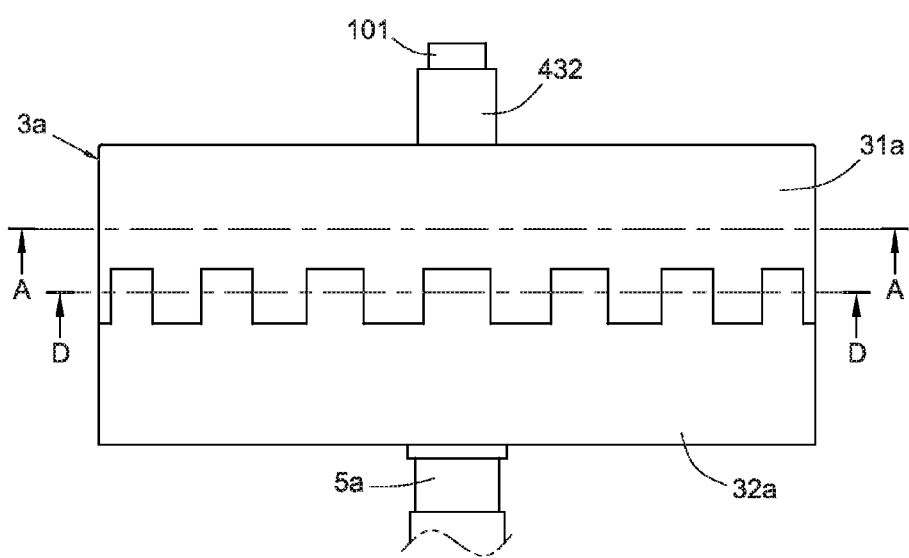
FIG. 3 is a side view of FIG. 2.
Figure 4:
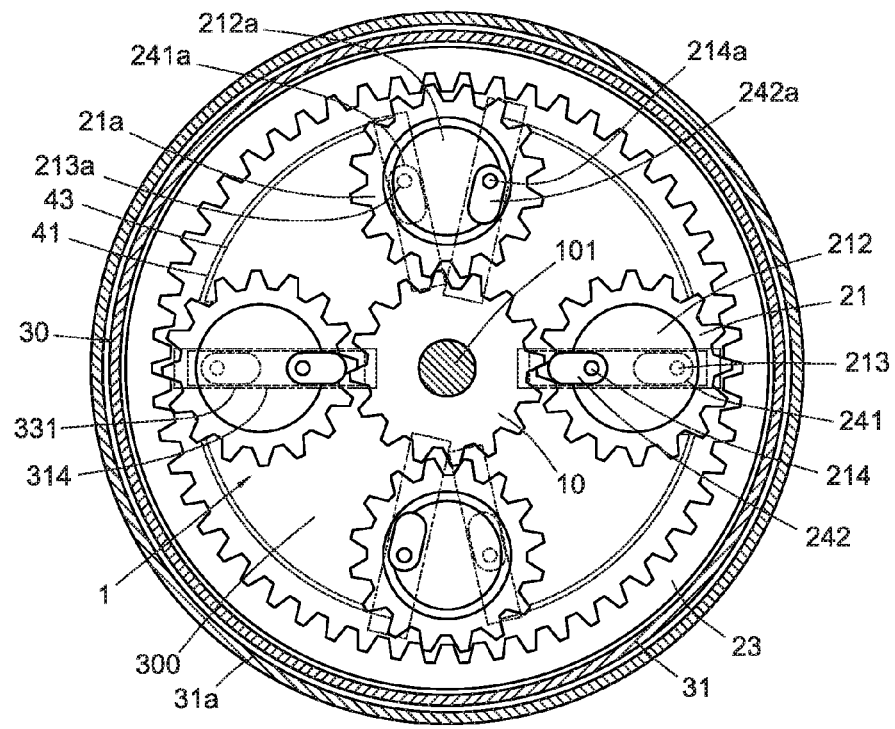
FIG. 4 is an A-A sectional view of FIG. 3.
Figure 7:
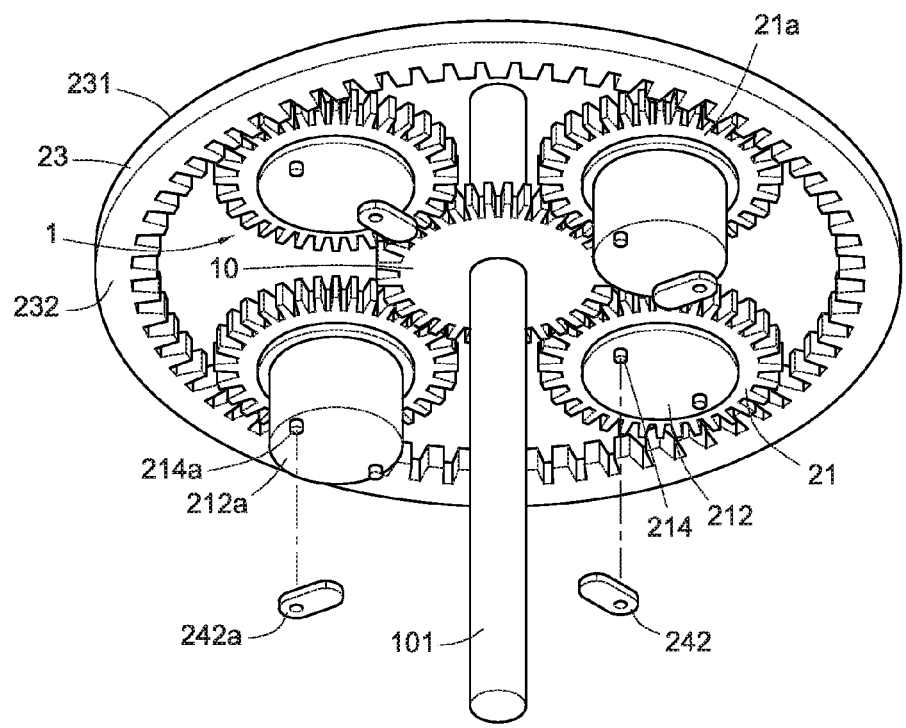
FIG. 7 is a partially enlarged view of the planetary gear set in FIG. 1.
Figure 8:
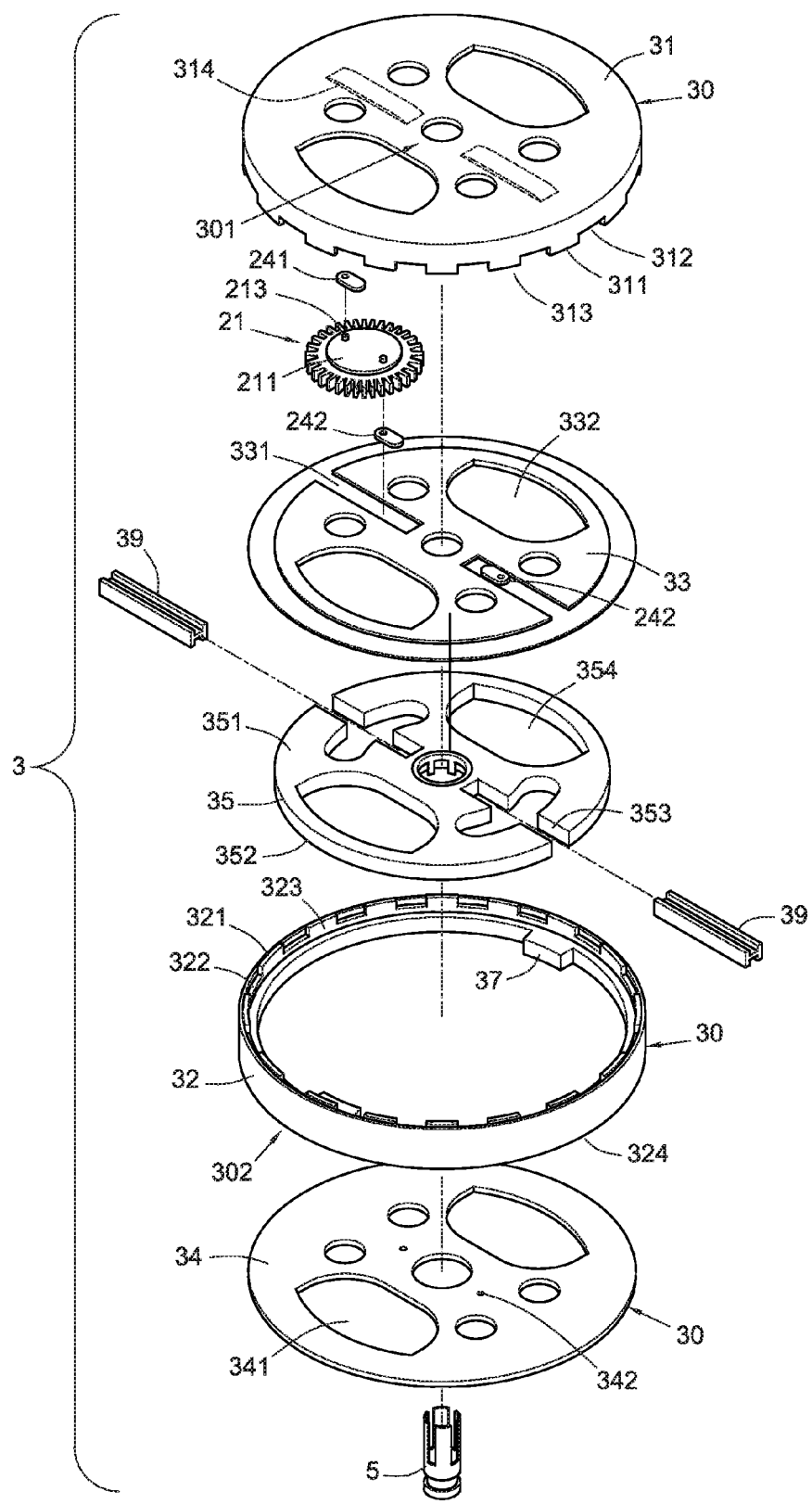
FIG. 8 is an exploded view of one of the eccentric control panel set in FIG. 1.
Figure 9:
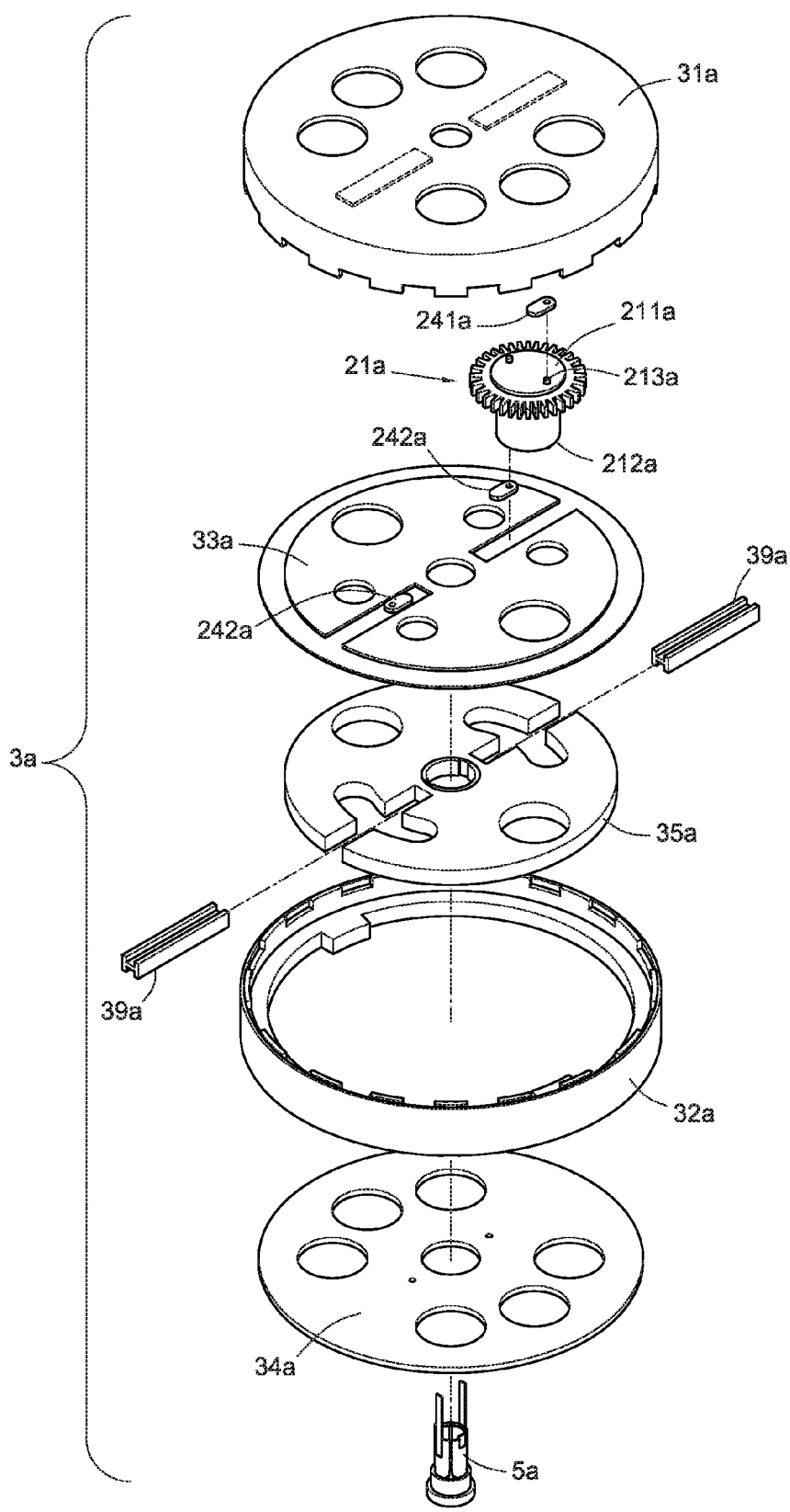
FIG. 9 is an exploded view of another eccentric control panel set in FIG. 1.

FIG. 1 discloses the exploded view of the first embodiment of present invention. FIGS. 1, 2, and 7 disclose the ring disk reciprocating power conversion device of present invention, which includes a planetary gear set 1 and at least one eccentric control panel set 3. The planetary gear set 1 is provided with a solar wheel 10 and a plurality of planet wheels 21,21a engaged in the periphery of the solar wheel 10. In the present embodiment, the quantity of the planet wheels 21,21a can be four, which are provided in the periphery of the solar wheel 10 with equal interval, and thus making a 180 degrees angle between the planet wheels 21,21a which arranged in both sides of the solar wheel 10. The angle between planet wheels 21a is also 180 degrees. Planet wheels 21 are defined as a first group, and planet wheels 21a are defined as second group. The periphery of the first group planet wheels 21 and the second group planet wheels 21a engage to a rotatable gear rim 23, making the planet wheels 21, 21a movably arranged in the periphery of the solar wheel 10. Two end surfaces 231,232 of the gear rim 23 are provided with rings 41, 42, respectively. The planet wheels 21, 21a are situated between the rings 41, 42, and the rings 41, 42 can clamp the position where the planet wheels 21, 21a engage to the gear rim 23. First axial parts 211, 211a and second axial parts 212, 212a are provided on the two end surfaces of the planet wheels 21, 21a, respectively, as shown in FIG. 8 and FIG. 9. The first axial parts 211, 211a and the second axial parts 212, 212a of the planet wheels 21, 21a movably hitch a first frame piece 43 and a second frame piece 44, respectively.

The first frame part 43 is formed as a round plate shape, and first frame slots 431 which has equal quantities as that of the planet wheels 21, 21a are formed in the edge of the first frame part 43. The first axial parts 211, 211a are pivoted in the first frame slots 431, and the first frame part 43 is pivoted in the ring 41. The second frame part 44 is also formed as a round plate shape, and second frame slots 441 which have equal quantities as that of the planet wheel 21, 21a is formed in the edge of the second frame piece 44. The first axial parts 211, 211a are pivoted in the second frame slot 441, and the second frame piece 44 is pivoted in the ring 42. A first axial rod 101 is provided on a center axle of the solar wheel 10. The center axle of the solar wheel 10 means the axle of the rotation center of the solar wheel 10. A second axial rod 432 is provided on the center axle of the first frame piece 43, and the center axle means the axle of the rotation center of the first frame piece 43. The solar wheel 10 and the first frame piece 43 are arranged in the same axis line. A through hole 433 is formed in the second axial rod 432, and one end of the first axial rod 101 is pivoted in the through hole 433. The top surface of the first axial parts 211, 211a of the planet wheels 21,21a are provided with first eccentric axes 213, 213a. The top surface of the second axial parts 212, 212a of the planet wheels 21,21a are provided with second eccentric axes 214, 214a. The first eccentric axes 213, 213a and the second eccentric axes 214, 214a are arranged in both sides of the center axle of the planet wheels 21, 21a, respectively. The center axles of the planet wheels 21, 21a mean the axles of the rotation center of the planet wheels 21, 21a. A 180 degrees included angle is formed between the first eccentric axes 213, 213a and the second eccentric axes 214, 214a. The first eccentric axes 213, 213a are pivoted with rectangle shaped first sliding members 241, 241a, and the second eccentric axes 214, 214a are pivoted with rectangle shaped second sliding members 242, 242a.

The eccentric control panel set 3 includes a shell 30, a rotary disk 35, an annular chamber 36, a plurality of separation parts 37, a plurality of variable volume chambers 38, and a plurality of spacers 39 equal to the variable volume chambers 38. The shell 30 is formed as a cylindrical shape, and further provided with a containing room 300. The interior wall of the containing room 300 is provided with a corresponding first engagement part 301 and a second engagement part 302. The planetary gear set 1 is arranged in the containing room 300, and further pivoted in the first engagement part 301 via the first axial rod 101 and second axial rod 432. The second axial rod 432 extends to outside the shell 30 via the first engagement part 301. The shell 30 can be composed of a ring housing 31, a ring cover 32, and a round shape lower cover plate 34. A cover opening 313 is formed on one end of the ring housing 31. A first opening 323 and a second opening 324 are formed on both ends of the ring cover 32. The cover opening 313 of the ring housing 31 and the first opening 323 of the ring cover 32 embed each other via a plurality of teeth 311, 321 and groove parts 312, 322, making the interior of the ring housing 31 and the interior of the ring cover 32 connected to form the containing room 300. The lower cover plate 34 is pivoted in the second opening 324 of the ring cover 32 to close the containing room 300. The first engagement part 301 is provided in the interior wall of the ring housing 31, and the planetary gear set 1 is accommodated in the ring housing 31. The second engagement part 302 is arranged in the second opening 324.

Figure 12:
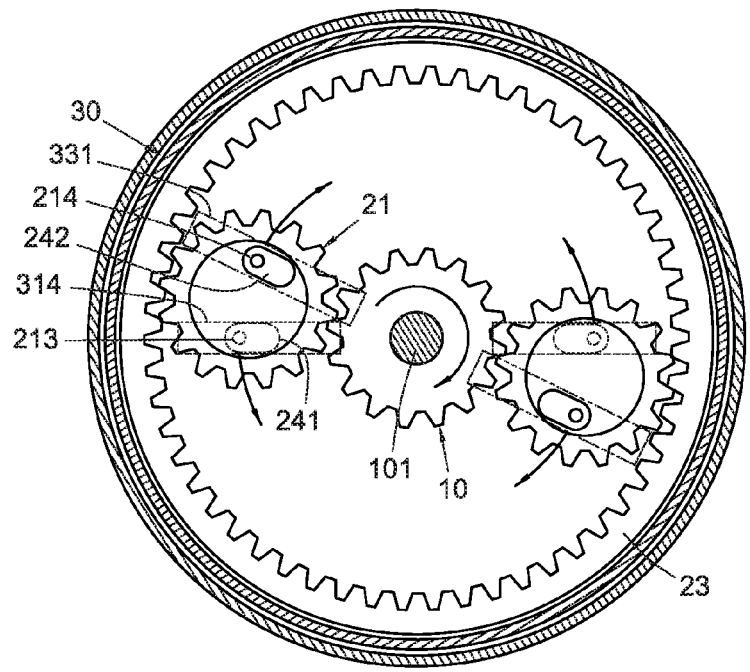
FIG. 12 is a schematic view in operating the apparatus of FIG. 4.
Figure 13:
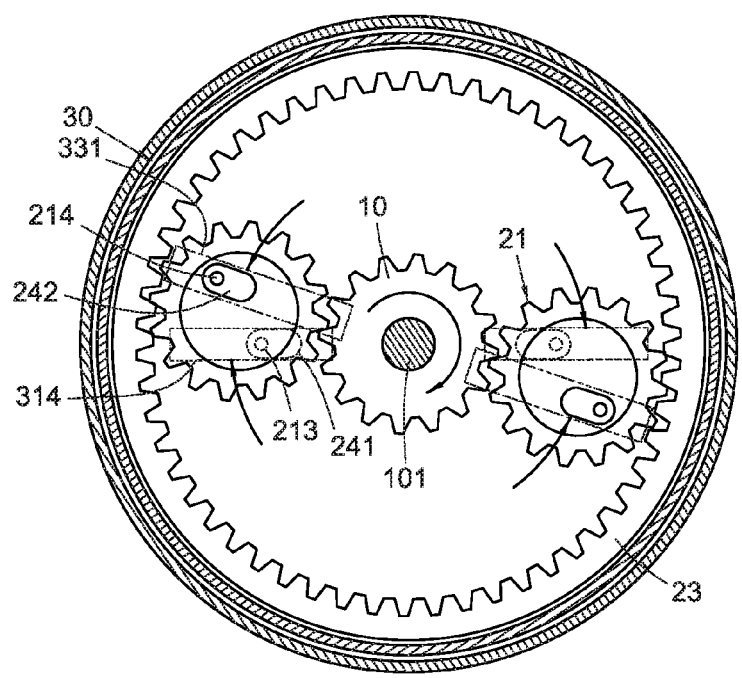
FIG. 13 is a schematic view in operating the apparatus of FIG. 4.
Figure 14:
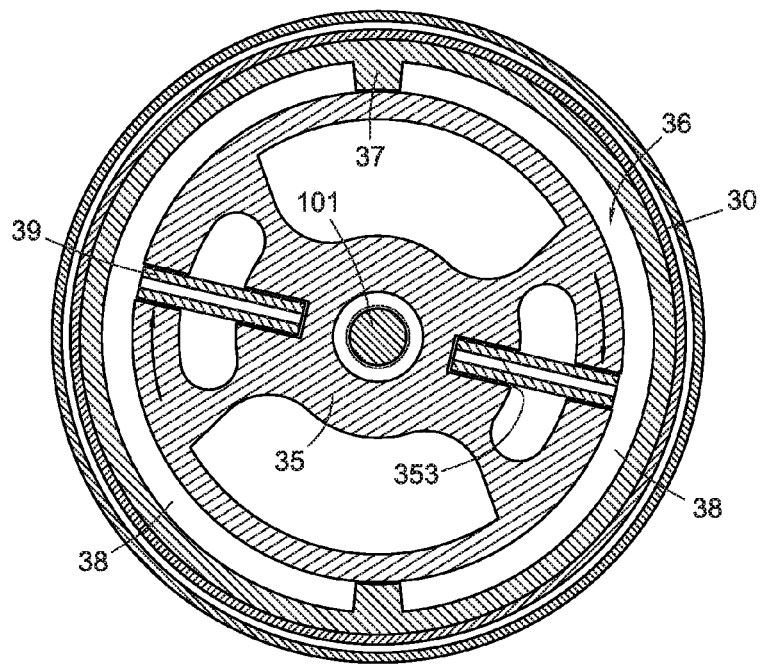
FIG. 14 is one of a schematic view in operating the apparatus of FIG. 10.
Figure 15:
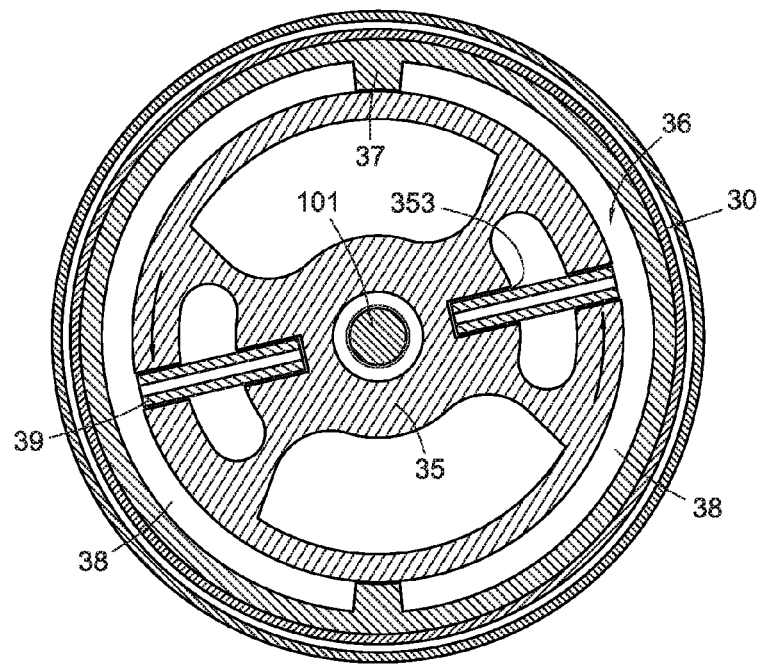
FIG. 15 is one of a schematic view in operating the apparatus of FIG. 10.

The rotary disk 35 is arranged in the containing room 300 and provided with a first plate surface 351 and a second plate surface 352, as shown in FIG. 8. The second plate surface 352 is fixed on the lower cover plate 34. The rotary disk 35 is pivoted in the second engagement part 302 via the lower cover plate 34, and further pivoted on the center axle of the solar wheel 10. Thus, the rotary disk 35 is arranged opposite to the planetary gear set 1, and the first plate surface 351 of the rotary disk 35 corresponds to the planetary gear set 1. An upper cover plate 33 is fixed on the first plate surface 351. Besides, the first axial rod 101 extends outside the shell 30 via the second engagement part 302, and the upper cover plate 33, rotary disk 35, and the lower cover plate 34 are coaxial pivoted on the first axial rod 101. The rotary disk 35 can be guided by the rotation of the planet wheel 21, as shown in FIGS. 12 and 13, and the rotary disk 35 can do reciprocating movement with limited amplitude, as shown in FIGS. 14 and 15. In fact, the present invention further includes a plurality of first guiding grooves 314 and second guiding grooves 33. Using the solar wheel 10 as the center, the first guiding groove 314 is formed in the first engagement part 301 in a radial shape. The first eccentric axis 213 of the first planet wheel 21 is slidably arranged in the first guiding groove 314 via the first sliding member 241. Using the center axle of the rotary disk 35 as the center, the second guiding groove 331 is formed in the upper cover plate 33 of the first plate surface 351 in a radial shape. The second eccentric axis 214 of the first planet wheel 21 is slidably arranged in the second guiding groove 331 via the second sliding member 242. Thus, the first planet wheel 21 can be guided by the first guiding groove 314 and the second guiding groove 331 to rotate via the first eccentric axis 213 and the second eccentric axis 214, and the rotary disk 35 can be guided by the second eccentric axis 214 to do the reciprocating movement via the second guiding groove 331.

Figure 10:
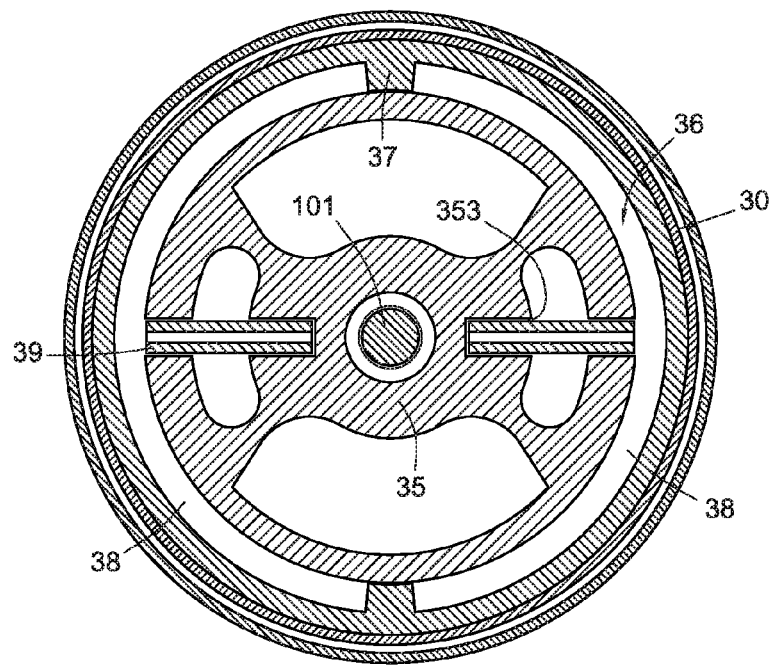
FIG. 10 is a D-D sectional view of FIG. 3.

The annular chamber 36 is formed at intervals in the periphery of the rotary disk 35. In fact, the annular chamber 36 is separated to between the outer peripheral wall of the rotary disk 35 and the interior wall of the containing room 300 of the shell 30 by the upper cover plate 33 and the lower cover plate 34, as shown in FIG. 10. The interior of the annular chamber 36 can accommodate a pressure forming medium, which can be oil in the present embodiment. The separation part 37 is formed in the interior wall of the ring cover 32 of the shell 30, as shown in FIG. 8. Thus, the separation part 37 is arranged in the containing room 300. The separation part 37 separates the annular chamber 36 to form the variable volume chamber 38. In the present embodiment, the number of the separation part 37 can be two, and the separated annular chamber 36 forms two variable volume chambers 38.

Figure 16:
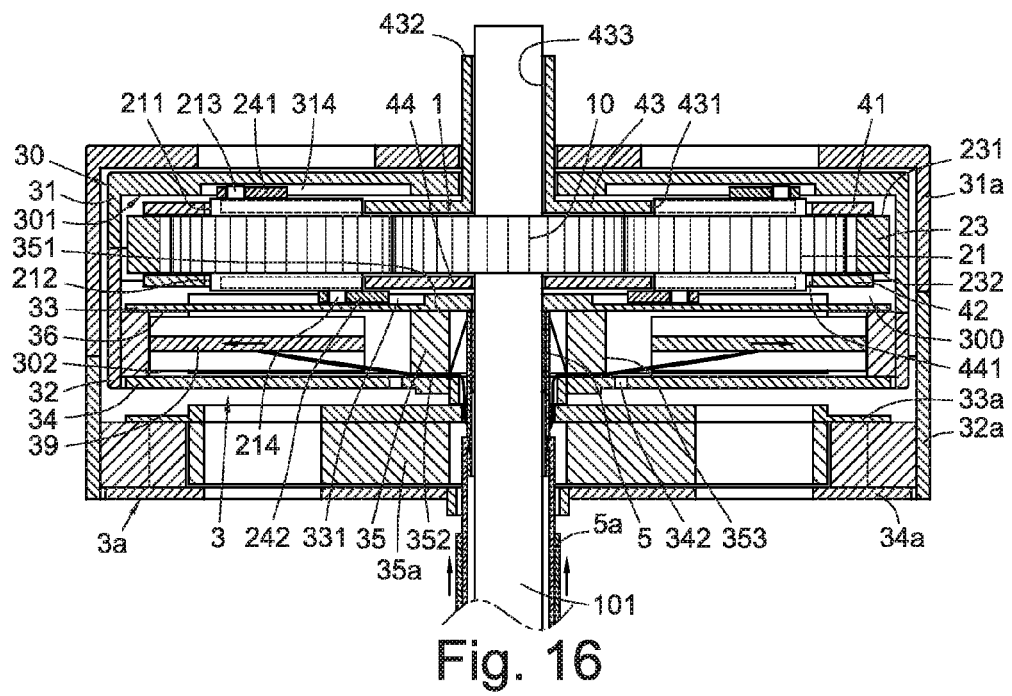
FIG. 16 is a schematic view in operating the apparatus of FIG. 5.
Figure 17:
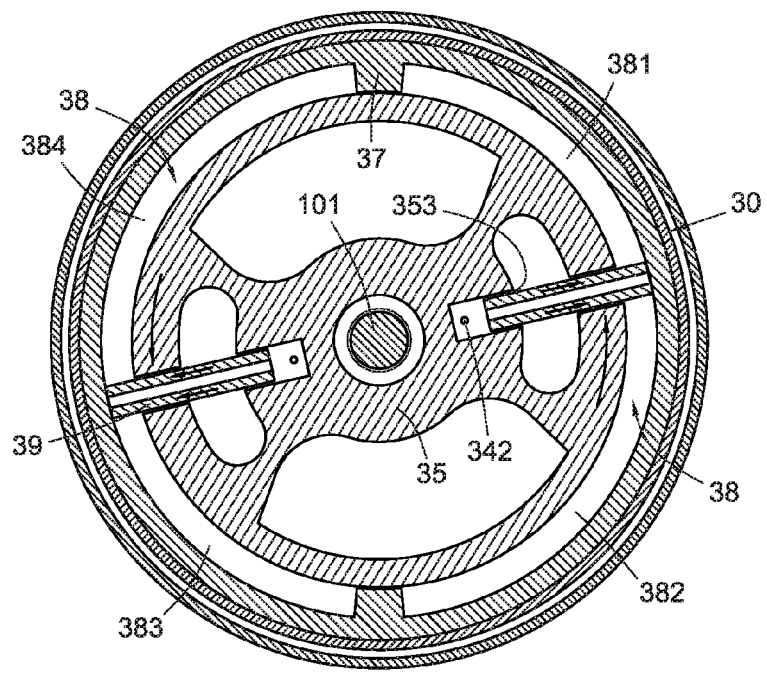
FIG. 17 is another schematic view in operating the apparatus of FIG. 10.

The spacers 39 are movably arranged in the periphery of the rotary disk 35. Actually, equal amount of containing troughs 353 as the spacers 39 are formed in the periphery of the rotary disk 35. The containing trough 353 connects the variable volume chamber 38 and accommodates the spacers 39. Thus, the spacers 39 can enter the variable volume chamber 38 via the containing trough 353, as shown in FIG. 17, and do the reciprocating movement in limited amplitude with the rotary disk 35 to push or draw the medium to regulate and stop the rotation of the first planet wheel 21. The spacers 39 can also return to the containing trough 353 to depart from the variable volume chamber 38, as shown in FIG. 16, and further releases the first planet wheel 21 to rotate. Besides, the center axle of the rotary disk 35 is provided with a casing tube 5. The center axle of the rotary disk 35 means the rotation center of the rotary disk 35. The casing tube 5 and the spacers 39 can connect to each other by a rope 20. The casing tube 5 can move in accordance with the rotation direction of the rotary disk 35, and further drives the spacers 39 to enter or exit the variable volume chamber 38. In the present embodiment, the number of the spacer can be two. The cross section of the spacers 39 can be "H" shape, which benefits the movement of the spacers 39 in the medium. The variable volume chamber 38 is the operating section of the high positive pressure oil and the high negative pressure oil. Thus, the oil leaking between the variable volume chamber 38 and operating elements is hard to be avoided. In order to replenish the oil into the variable volume chamber 38, a quantity of a plurality of via holes 342 is equal to that of the containing troughs 353 are formed on the lower cover plate 34, and the via hole 342 connects the containing trough 353 to outside. Thus, the oil can be supplied to the containing trough 353 via the via hole 342, and the oil can also be guided into the variable volume chamber 38 by the spacers 39 which has H shape cross section.

Besides, present embodiment adopts two eccentric control panel set 3, 3a, as shown in FIG. 9. The eccentric control panel 3 is defined as the first set, and the eccentric control panel 3a is defined as the second set. According to the operating method mentioned above, the second eccentric control panel 3a is arranged on the outer periphery of the first eccentric control panel 3 to guide the second planet wheel 21a to rotate. The difference is that the upper cover plate 33, the rotary disk 35, and the lower cover plate 34 of the first eccentric control panel 3 form equal amount of ports 332, 354, and 341 as the second planet wheel 21a, and the second axial part 212a of the second planet wheel 21a extends to the outside of the lower cover plate 34 of the first eccentric control panel 3 in order to be guided by the rotary disk 35a of the second eccentric control panel 3a. Except the differences mentioned above, the assembly of the ring housing 31a, the upper cover plate 33a, ring cover 32a, lower cover plate 34a, spacer 39a and casing tube 5a are the same as the first eccentric control panel 3.

Figure 11:
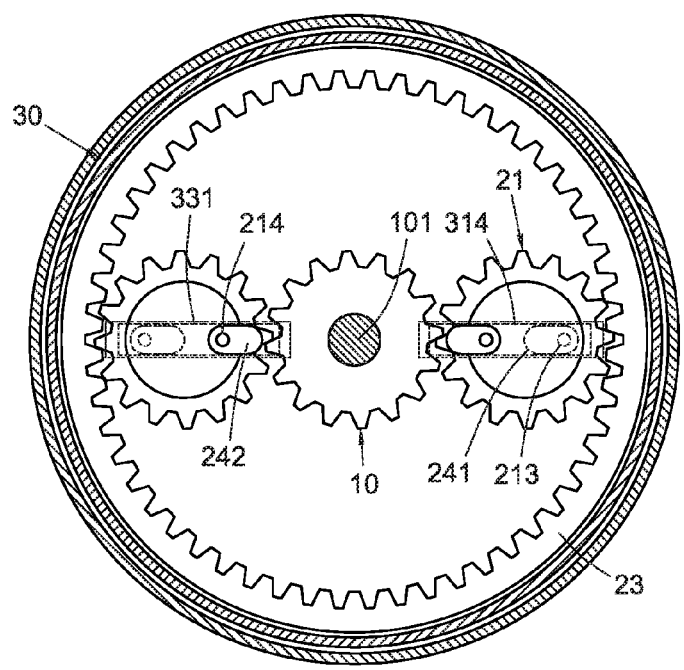
FIG. 11 is a schematic view in operating the apparatus of FIG. 4.

The method describe above can be used in the torque conversion of the transportation vehicle. The first axial rod 101 can be used as the exterior engine power input terminal, and the second axial rod 432 can be used as the engine power output terminal. When the spacers 39 not yet enters the variable volume chamber 38 to cut off the oil, as shown in FIG. 10, and the exterior engine power input via the first axial rod 101 and solar wheel 10, as shown in FIGS. 11 and 12, the revolution and rotation of the first planet wheel 21 and the second planet wheel 21a can be driven by the solar wheel 10. At the same time, the first planet wheel 21 rotates and guides the rotary disk 35 of the first eccentric control panel set 3 to do the reciprocating movement. Meanwhile, the first guiding groove 314 arranged in the shell 30 restricts the first sliding member 241 of the first eccentric axis 213 to move in the first guiding groove 314, as shown in FIG. 13. The second guiding groove 331 which swings with the rotary disk 35 can restrict the second sliding member 242 of the second eccentric axis 214 to move in the second guiding groove 331, and further makes the first planet wheel 21 to rotate. At this time, the revolution and the rotation of the planet wheel 21 are in a balance condition, and the power output from the solar wheel 10 cannot be fully released. The first eccentric axis 213 moves with the rotation of the planet wheel 21, and via the first guiding groove 314 to guide the shell 30 to do the reciprocating movement in limited amplitude, as shown in FIGS. 14 and 15. The second eccentric axis moves with the rotation of the planet wheel 21, and via the second guiding groove 331 to guide the rotary disk 35 to do the reciprocating movement in limited amplitude, which makes a pendulum like reciprocating movement between the shell 30 and the rotary disk 35.

When the spacers 39 partially enter the variable volume chamber 38 to cut off the oil, as shown in FIG. 16, the spacers 39 can do the reciprocating movement with the rotary disk 35 to push or draw the medium, making the medium to form oil pressure, which dampens the relative reciprocating movement between the shell 30 and the rotary disk 35, forcing the planet wheel 21 not being able to freely rotate. Thus, the rotation force of the planet wheel 21 will increase with the revolution of the solar wheel 10, and the torque used to output the power from the planet wheel 21 via the second axial rod 432 will be increased. As such, the rotation of the first planet wheel 21 and the revolution with the solar wheel 10 can be regulated, and the torque output can also be controlled by regulating the dampening force.

When the spacers 39 fully enter the variable volume chamber 38 to cut off the oil, as shown in FIG. 17, the variable volume chamber 38 is separated into 4 oil pressure chambers 381, 382, 383, 384, forcing the planet wheel 21 to be fully locked and not being able to rotate. The planet wheel 21 does the revolution with the solar wheel 10 and fully responses the power of the solar wheel 10, and further outputs the power of the solar wheel 10 via the planet wheel 21 and the second axial rod 432. At this time, the revolution power of the planet wheel 21 is the same as the power of the solar wheel 10, and the power can be output via the torque generated by the revolution of the planet wheel 21. When the exterior engine power drives the second planet wheel 21a via the solar wheel 10, the second planet wheel 21a is also guided by the rotary disk 35a of the second eccentric control panel set 3a, and the operation principle is the same as previous disclosure. When the first eccentric axis 213 and the second eccentric axis 214 of the first planet wheel 21 rotate without dampening force generating, the first eccentric axis 213a and the second eccentric axis 214a of the second planet wheel 21a have the maximum dampening force. Therefore, the driving force of dampening generated by the first planet wheel 21 and the second planet wheel 21a is a composite function of sine function and cosine function, and which means the driving force always exist.

Present invention can control the output of the driving force by cutting off the oil or locking the planet wheels 21, 21a with damping. Present invention is a rigid hydraulic oil resistance torque converter, which is able to totally cut off the oil flowing, and the driving force can completely be reflected on the output power, lowering the power lost to nearly zero after the power conversion. Present invention can be applied to light or heavy mechanical equipment to enhance the power conversion efficiency and save lots of energy.

Figure 5:
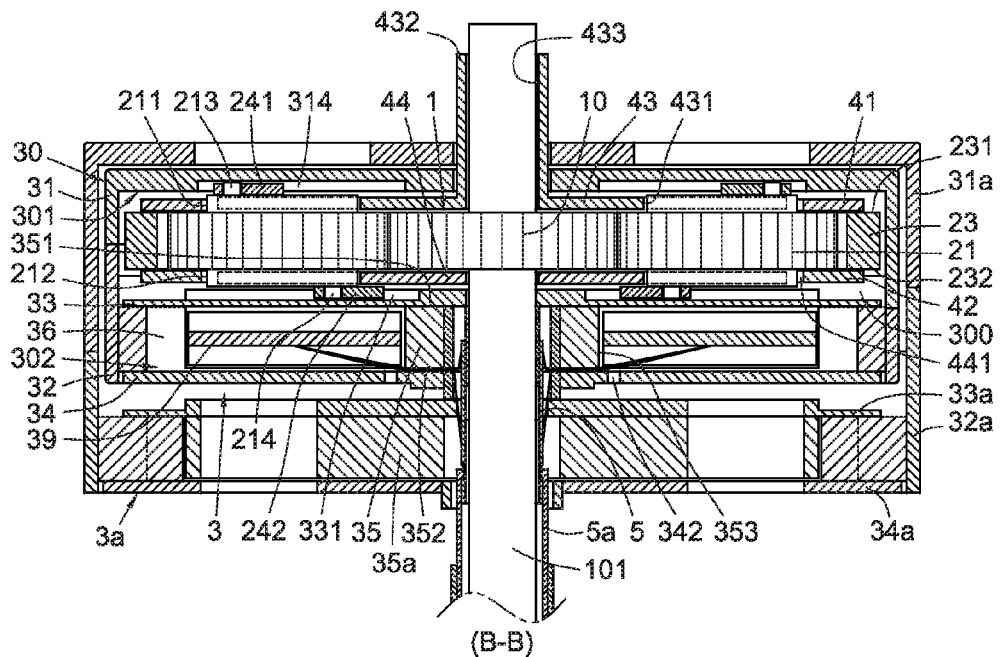
FIG. 5 is a B-B sectional view of FIG. 2.
Figure 6:
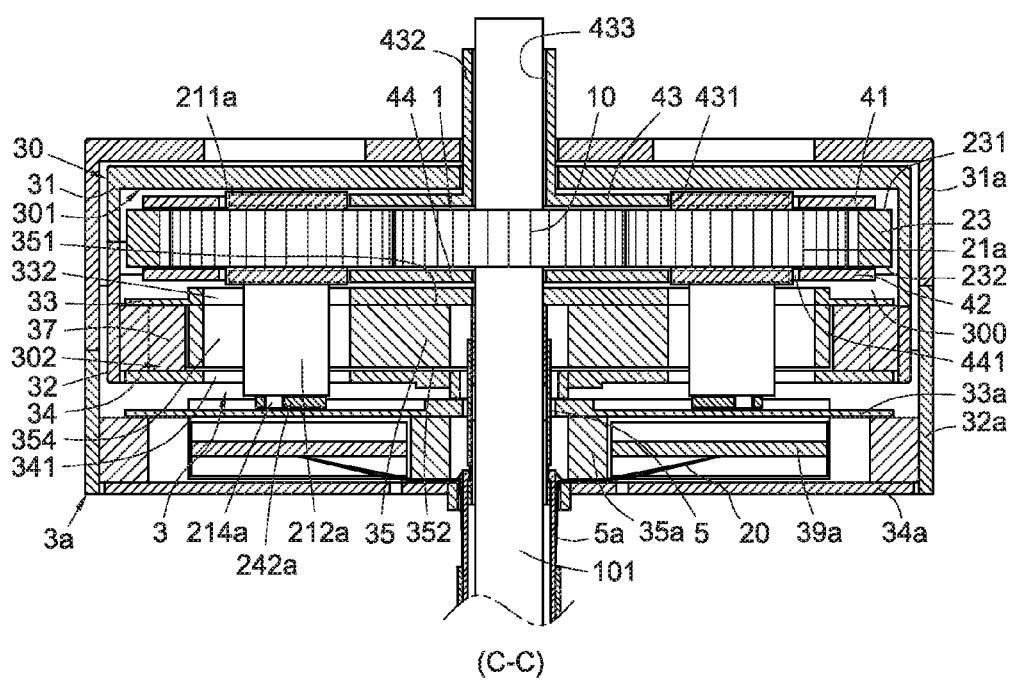
FIG. 6 is a C-C sectional view of FIG. 2.
Figure 18:
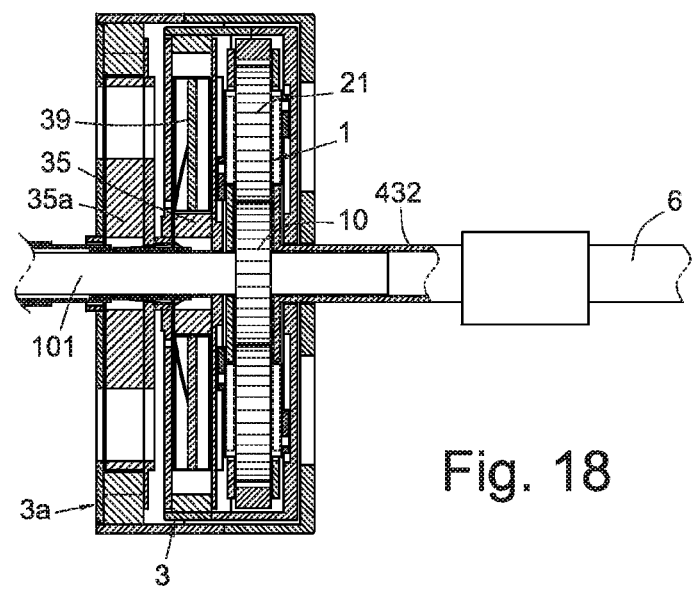
FIG. 18 is an exploded view of the second embodiment of the present invention.

Please refer to FIG. 18, the difference between the cross-section view of the second embodiment and the first embodiment of the present invention is that in the second embodiment, the first axial rod 101 can be arranged in a fixed base to be a fixed end, which restricts the rotation of the solar wheel 10. The second axial rod 432 can be a movable end which drives the planet wheels 21, 21a, as shown in FIGS. 5 and 6. The movable end can connect an exterior rotation mechanism and drive the planet wheels 21, 21a to do the revolution and rotation along the solar wheel 10, and other elements or configuration are the same as the first embodiment. The operation principle as described above can be applied to the rotation deceleration of the transportation vehicle. An axle 6 is used as the rotation mechanism in the present embodiment. When the power of the axle 6 inputs via the second axial rod 432 and the planet wheels 21, 21a, the planet wheels 21, 21a can be directly driven, and the rotary disks 35, 35a will do the reciprocating movement by the guiding of the rotation of the planet wheels 21, 21a, and the planet wheels 21, 21a will do the revolution along the solar wheel 10.

When the spacers 39, 39a partially enter the variable volume chamber 38 (see FIG. 16), the damping force of the oil will slow down the rotation of the planet wheels 21, 21a, and so do the revolution of the planet wheels 21, 21a along the solar wheel 10, thus generating dampening force to slow down the axle 6. When the spacers 39, 39a fully enter the variable volume chamber 38 (see FIG. 17), the oil flowing in the chambers 381, 382, 383, 384 is completely cut off, which locks the planet wheels 21, 21a with the solar wheel 10 and further stops the axle 6. Thus, by regulating the dampening force, the power input from the axle 6 can be dampened and the power of the axle 6 can be diminished. Other operation principles are the same as the first embodiment of the present invention. In the present embodiment, the dampening force of the oil can be used for deceleration. When the dampening force completely applied, the power will translate to the pressing force for compressing the oil, therefore only the friction heat of the flowing oil and the oil compressing heat will be generated. The heat will disperse in the whole annular chamber 36 to avoid the friction heat that concentrated on the friction surface of the traditional brake lining, and in addition to avoid the accidentally locked-up of rotation.

Figure 19:
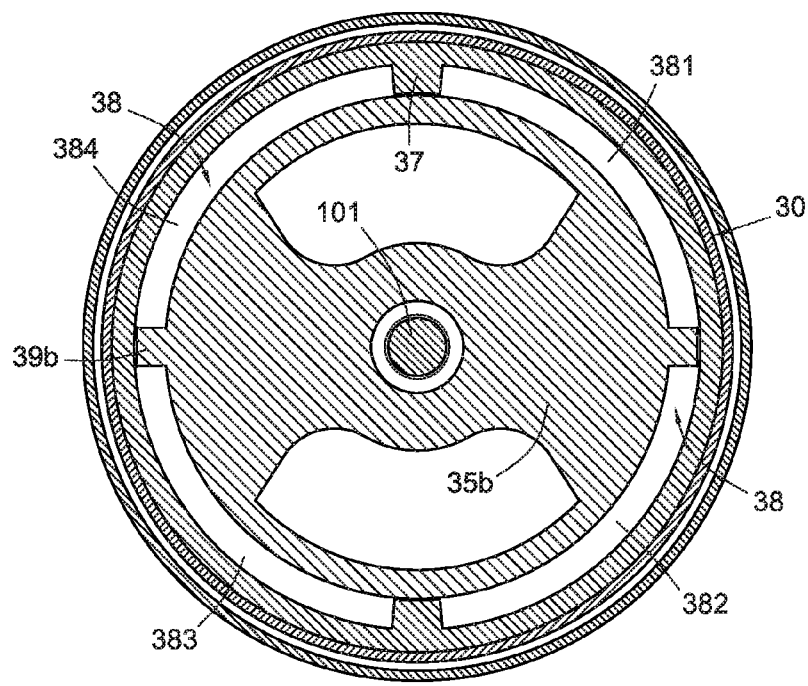
FIG. 19 is an exploded view of the third embodiment of the present invention.

Please refer to FIG. 19, the difference between the cross-section view of the third embodiment and the first embodiment of the present invention is that the spacer 39b is integral as a whole or fixed to the periphery of the rotary disk 35b, and the spacer 39 separates the variable volume chamber 38 to compress or draw the medium. The first axial rod 101 of the solar wheel 10 is used as power input terminal, and other elements and configurations are the same as the first embodiment. The operation principle as described above can be applied to a compressor. The separation part 37 and the spacers 39b separate the variable volume chamber 38 into four compressing and drawing chambers 381, 382, 383, 384, and the medium in the present embodiment can be air or coolant. The chambers 381, 382, 383, 384 are connected to the inlet or outlet pipes, respectively. When the power of a motor drives the planet wheels 21, 21a to rotate via the first axial rod 101 and the solar wheel 10, the rotary disk 35b is guided by the rotation of the planet wheels 21, 21a, making the spacers 39b to do the reciprocating movement with the rotary disk 35b in limited amplitude, and further reciprocatingly compress and drawing the air or coolant in the chambers 381, 382, 383, 384 in sequence. Air and coolant are discharged via output pipes after being compressed.

Besides, the numbers of compressing and drawing in a rotation cycle can be set by the gear ratio of the solar wheel 10 and the planet wheels 21, 21a, and the numbers of the variable volume chambers 38. For example, the gear ratio is 1:1, and the variable chamber 38 is separated into four chambers 381, 382, 383, 384. One circle rotation of the solar wheel 10 also makes the planet wheels 21, 21a to rotate one circle as well. As such, four compressions and drawings can be made, and the other operation principles are the same as the first embodiment. By the volume changing of the chambers 381, 382, 383, 384 of the variable volume chamber 38, the compressed and drew operation are continuously and alternately changing, to achieve the goal of push-out and draw-in the air or the coolant, and further improves the compress-draw power, as well as the compress-draw efficiency.

Figure 20:
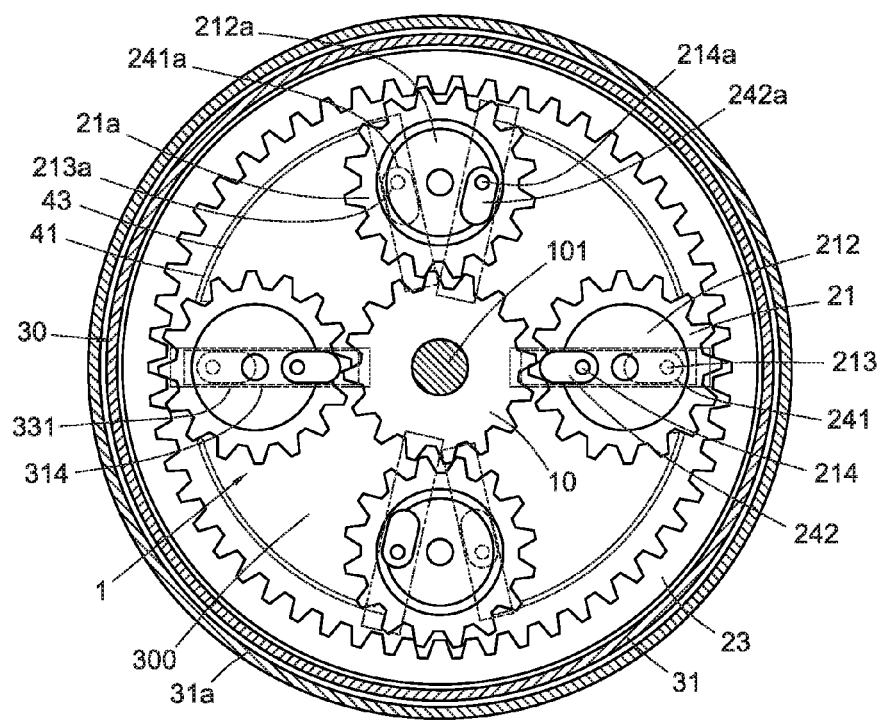
FIG. 20 is an exploded view of the fourth embodiment of the present invention.

Please refer to FIG. 20, the difference between the cross-section view of the fourth embodiment and the third embodiment of the present invention is that the center axle of the planet wheels 21, 21a can be pivoted on the first engagement part 301, as shown in FIGS. 5 and 6, and thus situated on the periphery of the solar wheel 10. Or, the center axle of the planet wheels 21, 21a can used the rotary disk 35b as a fixed end, and the planet wheels 21, 21a are pivoted on the periphery of the solar wheel 10. Or, the center axle of the planet wheels 21, 21a can also use the gear ring 23 as a fixed end, and the planet wheels 21, 21a are pivoted on the periphery of the solar wheel 10. The first axial rod 101 of the solar wheel 10 is used as the power output terminal, and other elements or configurations are the same as the third embodiment of the present invention. Present embodiment can be applied to the switch chamber type internal combustion engine. The chambers 381, 382, 383, 384 can be used as the combustor of the cylinder. The medium can be fuel oil. The chambers 381, 382,

383, 384 are connected to the inlet or outlet pipes for the fuel oil, respectively. The spacer 39b in the present embodiment can be used as piston. Therefore, there will be two volume decreased chambers and two volume increased chambers among the chambers 381, 382, 383, 384 at the same time. The fuel can be ignited in the chamber 381 of the variable volume chamber 38 to generate the explosive force, as shown in FIG. 9. The explosive force drives the spacer 39b to extend the chamber 381, making the spacer 39b to drive the rotary disk 35b to do the reciprocating movement in limited amplitude, which further guides the planet wheels 21, 21a to rotate. By the rotation of the planet wheels 21, 21a, the solar wheel 10 and the first axial rod 101 can be driven to output the power. Meanwhile, the spacer 39b compresses the chamber 382 to force the chamber 382 to discharge the exhaust gas generated by burning fuel oil. The spacer 39b extends another chamber 383, forcing the chamber 383 to draw in the fuel oil. The spacer 39b compresses another chamber 384 to force the chamber 384 to compress the fuel oil. By way of this, drawing, compressing, explosion, and emission of the internal combustion can continuously and orderly happen, which can continuously drive the planet wheels 21, 21a to force rotation of the solar wheel 10. Other elements and configurations are the same as the third embodiment.

Thus, the chambers 381, 382, 383, 384 can be used as an air-drawing chamber, a compressing chamber, an explosion chamber, and an emission chamber, respectively. By continuously driving the planet wheels 21, 21a, the solar wheel 10 and the first axial rod 101 can be driven to output the power. The enhancement of the explosion power of the fuel oil can be transformed to improve the power output efficiency. Besides, the spacers 39b are movable element for doing the reciprocating movement in limited amplitude. The explosion power can simultaneously drive each spacer 39b and the planet wheels 21, 21a to generate the rotation of the planet wheels 21, 21a. Thus, the explosion power can completely transformed to the rotation propelling power of the planet wheels 21, 21a, and the power lost is zero, which can improve the fuel burning efficiency and save energy.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A ring disk reciprocating power conversion device, comprising:
    a planetary gear set provided with a solar wheel and a plurality of planet wheels engaged in the periphery of the solar wheel; and
    at least one eccentric control panel set, comprising:
        a rotary disk pivoted on a center axle of the solar wheel and arranged opposite to the planetary gear set, being able to receive guiding from rotation of the planet wheel, forcing the rotary disk to do a reciprocating movement in limited amplitude;
        an annular chamber, formed in a periphery of the rotary disk, the annular chamber accommodating a pressure forming medium, wherein the medium is oil;
        a plurality of separation parts, separating the annular chamber to form a plurality of variable volume chambers; and
        a plurality of spacers having equal quantities as that of the plurality of variable volume chambers, movably arranged in the periphery of the rotary disk, and being able to enter the plurality of variable volume chambers to press or draw the medium to regulate and stop the rotation of the planet wheel, and being able to leave the plurality of variable volume chambers to release the planet wheel to rotate.

2. The ring disk reciprocating power conversion device according to claim 1, wherein a first axial rod is disposed on the center axle of the solar wheel, an end surface of the planet wheel movably hitches a frame piece, and a second axial rod is disposed on the center axle of the frame piece.

3. The ring disk reciprocating power conversion device according to claim 2, wherein the first axial rod is used as a power input terminal, the first axial rod can drive the planet wheel to rotate via the solar wheel, and the second axial rod is used as a power output terminal to transfer a power of revolution of the planet wheel.

4. The ring disk reciprocating power conversion device according to claim 1, wherein a quantity of a plurality of containing troughs is equal to a quantity of the plurality of spacers, and the plurality of containing troughs are formed in the periphery of the rotary disk for accommodating the plurality of spacers, and the plurality of spacers can enter the plurality of variable volume chambers via the trough, and then leave the plurality of variable volume chambers to enter the trough.

5. The ring disk reciprocating power conversion device according to claim 1, wherein a shell is disposed on the eccentric control panel set, a first engagement part and a second engagement part corresponds the first engagement part are formed on an interior wall of the shell, the planetary gear set is pivoted on the first engagement part, the rotary disk is pivoted on the second engagement part, the annular chamber is formed between the periphery of the rotary disk and the interior wall of the shell, and one side of the rotary disk is corresponding to the planetary gear set.

6. The ring disk reciprocating power conversion device according to claim 1, wherein a number of the plurality of the planet wheels is four, and the four planet wheels are arranged on a periphery of the solar wheel; a number of the at least one eccentric control panel set is two, and the two eccentric control panel sets leads two planet wheels to rotate respectively; a number of the plurality of separation parts is two, and the two separation parts separating the annular chamber to form two variable volume chambers.

7. The ring disk reciprocating power conversion device according to claim 1, wherein an outer periphery of the plurality of the planet wheels engage a rotatable gear rim, two rings are disposed on two end surfaces of the gear rim, respectively, the plurality of the planet wheels are situated between the two rings; two end surfaces of the plurality of the planet wheels movably hitch a frame piece, and the frame piece situated in the ring.

* * * * *